US007522356B1

(12) United States Patent
Whitty

(10) Patent No.: US 7,522,356 B1

(45) Date of Patent: Apr. 21, 2009

(54) SIGHT HAVING AN ASYMMETRIC FIELD OF VIEW AND ITS MANUFACTURE

(75) Inventor: James R. Whitty, Midland (CA)

(73) Assignee: Raytheon Company, Waltham, MA (US)

(*) Notice: Subject to any disclaimer, the term of this patent is extended or adjusted under 35 U.S.C. 154(b) by 325 days.

(21) Appl. No.: 11/148,682

(22) Filed: Jun. 8, 2005

(51) Int. Cl.
*G02B 7/02* (2006.01)

(52) U.S. Cl. ........................ 359/811; 359/703; 359/819; 42/119

(58) Field of Classification Search ................. 359/703, 359/811, 819; 42/119; 356/247
See application file for complete search history.

(56) References Cited

U.S. PATENT DOCUMENTS

| | | | | |
|---|---|---|---|---|
| 4,090,780 A * | 5/1978 | Davis | ......................... | 359/826 |
| 4,940,324 A * | 7/1990 | Nichols | ...................... | 356/247 |
| 7,184,187 B2 * | 2/2007 | Cannon et al. | .............. | 359/213 |

* cited by examiner

*Primary Examiner*—Joseph Martinez
(74) *Attorney, Agent, or Firm*—H. St. Julian

(57) ABSTRACT

A sight includes at least one lens having a lens central axis parallel to a lens through-thickness direction and which is laterally physically truncated parallel to the lens central axis, and a sight housing in which the at least one lens is received. The sight housing has a horizontal dimension, and a vertical dimension less than the horizontal dimension. A greatest dimension of the lens is parallel to the horizontal dimension of the sight housing.

17 Claims, 3 Drawing Sheets

SIGHT HAVING AN ASYMMETRIC FIELD OF VIEW AND ITS MANUFACTURE

This invention relates to a sight, and more particularly to a telescopic sight such as that used with a rifle.

BACKGROUND OF THE INVENTION

A weapons such as a rifle or a pistol is sometimes provided with a telescopic sight using refractive (or reflective) optical components to form a magnified and/or intensified image of a target. The telescopic sight is typically formed with a group of lenses in a sight housing. The lenses may be fixed in position relative to each other for a fixed magnification, or may be controllably movable to achieve a controllably variable magnification. The sight housing is affixed to the upper side of the barrel of the weapon and generally aligned with the boresight of the barrel. The sight is thereafter precisely aligned using adjustments to the sight during actual or simulated live firing exercises, a process sometimes termed “sighting in”. Once precisely aligned, the sight is used for highly precise aiming of the weapon during service.

One of the problems experienced with the conventional telescopic sight is that its field of view is reduced proportionately with its increasing optical magnification of the target. That is, a sight with a magnification of 10× has a field of view of about half that of a sight with a magnification of about 5×. For some applications, this reduced field of view is acceptable, but in other applications such as military and police applications the reduced field of view is particularly disadvantageous because it increases the difficulty and time for the user to visually acquire the target. The reduced field of view also reduces the situational awareness of the user, so that the user peering through the sight becomes unaware of events near the target but outside the field of view.

The usual approach to achieving an increased field of view for a selected optical magnification is to increase the diameter of the lenses and the diameter of the sight housing. Large-diameter sights may be tolerated in applications such as target shooting, where the rifle and the user are in a fixed location and the acquisition time and situation awareness are not of great concern. However, the increase in the diameter of the lenses and of the sight housing increases the bulk and weight of the sight, so that it may become too unwieldy for use in military and police applications, and for hunters.

There is a need for an improved approach to sighting systems to provide increased magnification of the target, while at the same time maintaining a good field of view and situational awareness for the user. The present invention fulfills this need, and further provides related advantages.

SUMMARY OF THE INVENTION

The present invention provides a telescopic sight that may be used with a weapon such as a rifle or a pistol. The sight provides a greater field of view in the horizontal direction than does a conventional sight at a comparable magnification. The greater field of view is achieved without increases in weight and/or bulk. Alternatively, a comparable field of view may be achieved with reduced weight and bulk. The height of the sight above the weapon, which partially defines the profile or envelope of the combination of the weapon and the sight, is reduced below what it would otherwise be.

In accordance with the invention, a sight comprises at least one lens, and a sight housing in which the at least one lens is received. The at least one lens has a lens through-thickness direction and two orthogonal transverse directions perpendicular to the through-thickness direction. A lens first transverse dimension measured along a lens first transverse direction is greater than a lens second transverse dimension measured along a lens second transverse direction. The sight housing has a sight length direction parallel to the lens through-thickness direction, a sight first transverse direction parallel to the lens first transverse direction, and a sight second transverse direction parallel to the lens second transverse direction. A sight first transverse dimension measured along the sight first transverse direction is greater than a sight second transverse dimension measured along the sight second transverse direction. There is normally provided a gun-barrel attachment on an exterior of the sight housing.

Desirably, each lens is optically circularly symmetric about a lens central axis parallel to the lens through-thickness direction, but each lens is physically truncated along the second transverse direction. Each lens is preferably physically truncated along the second transverse direction symmetrically relative to the lens central axis. There may be lenses in the sight that are of sufficiently small diameter that they are not physically truncated along the second transverse direction, but the sight includes at least some lenses that are physically truncated along the second transverse direction.

The at least one lens preferably comprises an objective lens (which may include two or more objective lenses), and an eyepiece lens. Each lens desirably has the lens through-thickness direction and the two orthogonal transverse directions perpendicular to the through-thickness direction. The lens first transverse directions of all of the lenses are parallel, and the lens first transverse direction of each of the lenses is greater than the lens second transverse direction of the respective lens.

The sight housing desirably has an entry viewing port and an exit viewing port. The entry viewing port has an entry viewing port first transverse direction parallel to the lens first transverse direction and an entry viewing port second transverse direction parallel to the lens second transverse direction. An entry port first transverse dimension measured along the entry viewing port first transverse direction is preferably greater than an entry port second transverse dimension measured along the entry viewing port second transverse direction. The exit viewing port has an exit viewing port first transverse direction parallel to the lens first transverse direction and an exit viewing port second transverse direction parallel to the lens second transverse direction. An exit port first transverse dimension measured along the exit viewing port first transverse direction is preferably greater than an exit port second transverse dimension measured along the exit viewing port second transverse direction.

Stated alternatively, a sight comprises at least one lens having a lens central axis parallel to a lens through-thickness direction and which is laterally physically truncated on surfaces that generally lie parallel to the lens central axis, and a sight housing in which the at least one lens is received. The sight housing has a horizontal dimension and a vertical dimension less than the horizontal dimension. A greatest dimension of the lens is parallel to the horizontal dimension of the sight housing. Other compatible features as discussed herein may be used with this embodiment.

A method for manufacturing a sight comprises the step of fabricating at least one lens. The at least one lens desirably comprises one or more objective lenses, and an eyepiece lens. The step of fabricating includes preparing each lens as optically circularly symmetric about a lens central axis and having a lens first transverse direction and a lens second transverse direction orthogonal to each other and orthogonal to the lens central axis. Each lens is physically truncated along the lens second transverse direction, preferably at equal distances on either side of the lens central axis. The method further includes furnishing a sight housing. The sight housing has a sight length direction, a sight first transverse direction, and a sight second transverse direction. A sight first transverse dimension measured along the sight first transverse direction is greater than a sight second transverse dimension measured along the sight second transverse direction. Each lens is mounted in the sight housing with the lens central axis parallel to the sight length direction and with the lens first transverse direction parallel to the sight first transverse direction. The sight housing desirably is furnished with entry and exit viewing ports as described previously. The sight housing is also preferably furnished with the gun-barrel attachment on an exterior of the sight housing. Other compatible features as discussed herein may be used with this embodiment.

The present sight achieves an increased field of view in one direction, typically the horizontal direction, without increasing the size and weight of the sight, by reducing the field of view in an orthogonal direction, typically the vertical direction, where it is not needed in most applications. Most conventional sights have a much larger field of view in the vertical direction than is needed, because the lenses and the sight housing are cylindrically symmetric in shape. In the present approach, the lenses are preferably fabricated as optically cylindrically symmetric in their viewing surfaces but truncated in their peripheral shapes, and the sight housing is conformably fabricated to mount the lenses. The sight is wider in one direction, typically the horizontal direction, than it is high. Field of view is gained in the wider direction, typically the horizontal direction, and sacrificed in the vertical direction. The sight may therefore be made with an increased horizontal field of view without added weight and size, or a horizontal field of view comparable with that of a conventional sight but with reduced weight and size. The reduction in weight and size is achieved through the reduced weight of the lenses and the sight housing, and the smaller envelope required for the sight housing. The loss of vertical field of view is typically not a significant disadvantage, and the vertical field of view takes in a large amount of sky and earth in the foreground, which are not ordinarily of interest. The sight maintains (or increases) the horizontal field of view, which is ordinarily of great interest because targets typically move in the horizontal field of view and non-target features of interest are in the horizontal field of view. Also, loss of some vertical field of view may actually make sighting easier by removing distractions and undesirable optical features such as glare from the sky or from water in the foreground. The present approach is compatible with other features used in sights, and with the use of an image intensifier in the sight.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
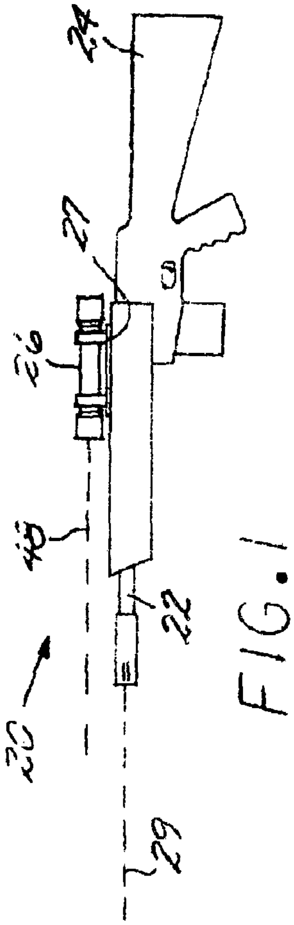
FIG. 1 is an elevational view of a rifle with a sight mounted thereto.

FIG. 1 depicts a rifle 20 having a barrel 22 and a stock 24. A sight 26 according to the present approach is mounted to the upper side of the barrel 22 by a mount 27, for the user to sight the rifle 20. The mount 27 may be of any operable type. Preferably, the mount 27 is adjustable to permit a sight central axis 48 of the sight 26 to be aligned and pointed relative to a bore axis 29 of the barrel 22. This adjustability allows the sight 26 to be fine tuned to the characteristics of the barrel 22, a "sighting in" process. Any operable adjustable mount 27 may be used, including the adjustable mounts used with conventional rifle sights. Equivalently for this purpose, the positions of the internal optical elements of the sight 26 may be laterally adjustable.

FIGS. 2-5 depict the sight 26 in greater detail. (These figures are not drawn to scale.) The sight 26 includes at least one lens 28, here depicted as two lenses 30 and 32 that collectively define an objective lens 34, and an eyepiece lens 36. The sight further includes a sight housing 38 in which the lenses 30, 32, and 36 are received and mounted. There is a gun-barrel attachment 40 on an exterior of the sight housing 38, serving as part of the mount 27, to attach the sight 26 to the rifle 20. The gun-barrel attachment 40 may be of any operable type but is preferably part of an adjustable mount, as described.

Figure 2:
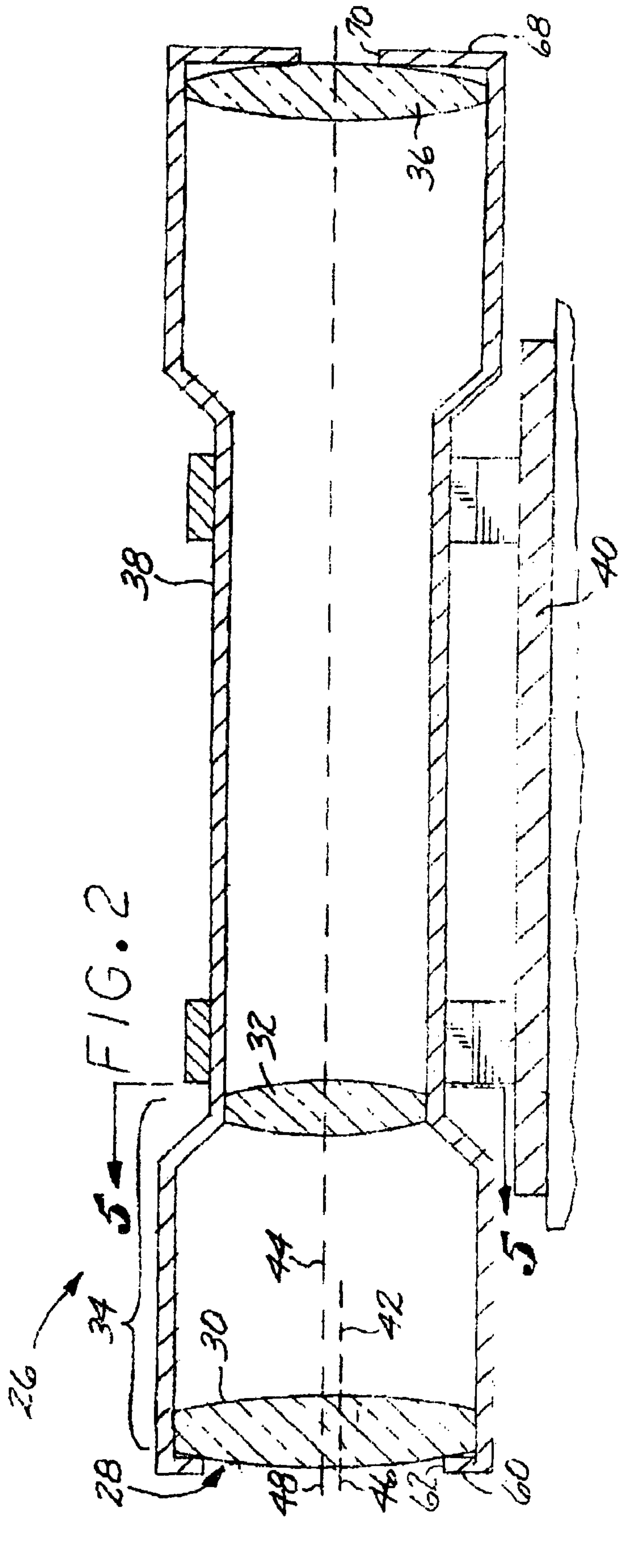
FIG. 2 is an enlarged schematic side sectional view of the sight.

Referring to FIG. 2, each lens 28 has a lens through-thickness direction 42, and a lens central axis 44 which is parallel to, and may be coincident with, the lens through-thickness direction 42. The sight housing 38 has a sight length direction 46, and a sight central axis 48 which is parallel to, and may be coincident with, the sight length direction 46. The assembled sight 26 has the lens through-thickness direction 42 parallel to the sight length direction 46, and may have the lens central axis 44 coincident with the sight central axis 48. In other instances, the lens central axis 44 may be displaced laterally from the sight central axis 48.

Figure 5:
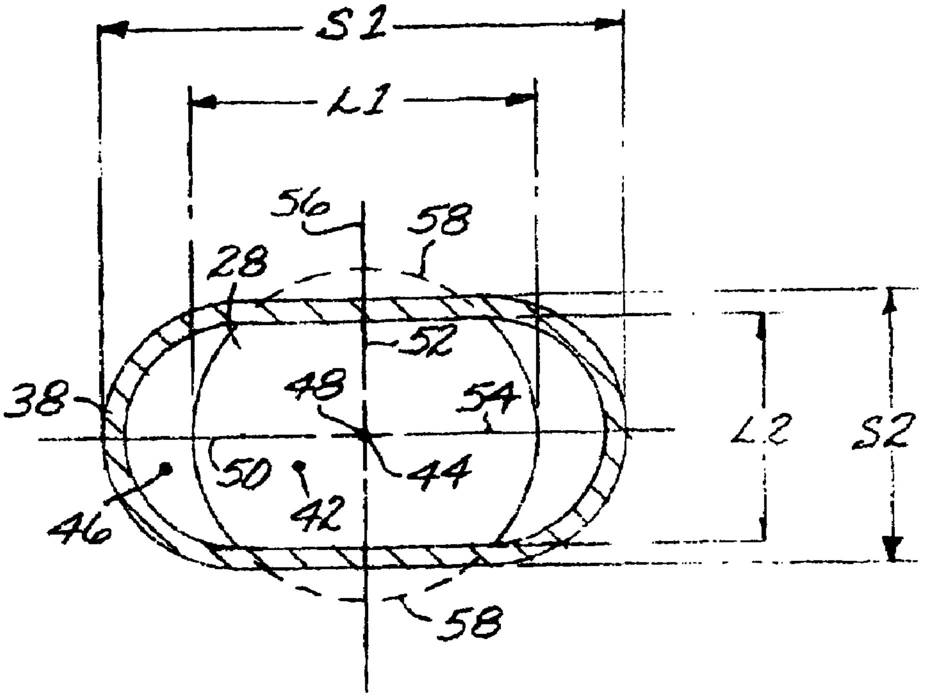
FIG. 5 is a further enlarged sectional view of the sight, taken on line 5-5 of FIG. 2, illustrating the shape of one of the lenses and the shape of the sight housing.

Referring to FIG. 5, each lens 28 (including lenses 30, 32, and 36 in the illustrated embodiment) has two orthogonal transverse directions 50 and 52 perpendicular to the lens through-thickness direction 42. A lens first transverse dimension L1 measured along a lens first transverse direction 50 is greater than a lens second transverse dimension L2 measured along a lens second transverse direction 52. A sight first transverse direction 54 is parallel to the lens first transverse direction 50, and a sight second transverse direction 56 is parallel to the lens second transverse direction 52. A sight first transverse dimension S1 measured along the sight first transverse direction 54 is greater than a sight second transverse dimension S2 measured along the sight second transverse direction 56. The dimensions S1 and S2 are the transverse dimensions of the sight housing 38, and thus define its exterior transverse envelope. Because S2 is less than S1, the height of the sight housing 38 (and thence the sight 26) is less than it would otherwise be, reducing the overall size envelope of the combination of the rifle 20 and the sight 26 when viewed in elevation as in FIG. 1.

Each lens 28 is preferably optically circularly symmetric about the lens central axis 44 parallel to the lens through-thickness direction 42, so that the user's view is not optically distorted. That is, its optical characteristics are like those of conventional lenses. However, each lens 28 is physically truncated along the lens second transverse direction 52, preferably by the same amount on each side of the lens central axis 44. Thus, one way to manufacture each physically truncated lens 28 is to prepare a conventional circular lens, as by casting or molding, to optically grind or otherwise finish the optical surfaces to the proper lens shape, and then to remove the peripheral portions of the lens along the lens second transverse direction 52 by cutting with a diamond tool or other technique, as indicated by dashed lines 58 to show the removed portion of the lens 28 in FIG. 5. The removed portion 58 is preferably symmetric on each side of the lens central axis 44, so that the lens 28 is a symmetrically physically truncated circle when viewed in plan view as in FIG. 5. Another way to manufacture each physically truncated lens 28 is to cast or mold it directly to the physically truncated shape and then to optically grind the optical surfaces, an approach that is particularly suitable for manufacturing plastic lenses. Each lens 28 is preferably centered on the lens central axis 44, and is preferably centered on the sight central axis 48 when the lens 28 is mounted in the sight housing 38.

Figure 3:
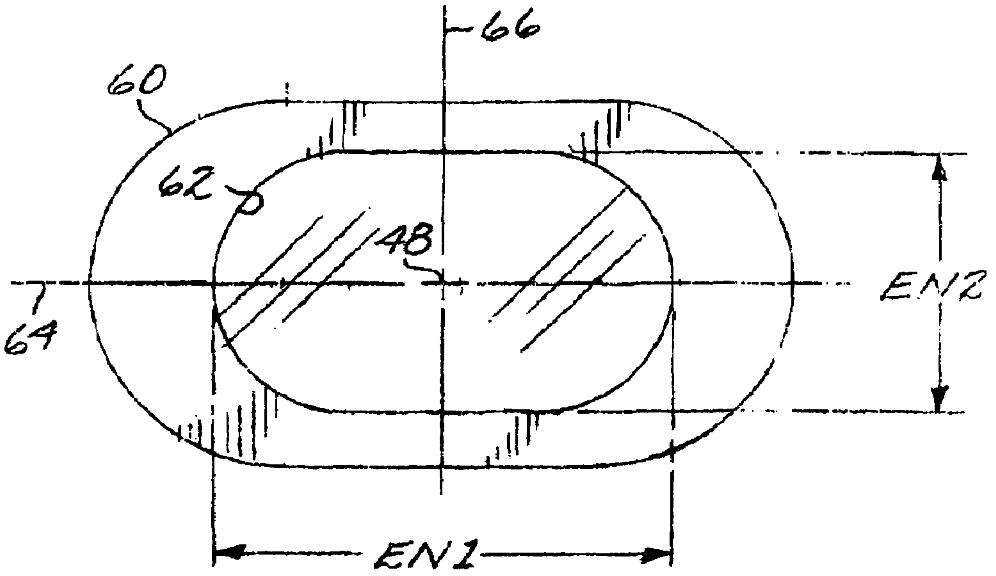
FIG. 3 is an elevational view of the entry end of the sight of FIG. 2.

The sight housing 38 has an entry end 60 with an entry viewing port 62, seen in FIGS. 2 and 3. The entry viewing port 62 has an entry viewing port first transverse direction 64 parallel to the lens first transverse direction 50 and an entry viewing port second transverse direction 66 parallel to the lens second transverse direction 52. Preferably, an entry port first transverse dimension EN1 measured along the entry viewing port first transverse direction 64 is greater than an entry port second transverse dimension EN2 measured along the entry viewing port second transverse direction 66. The entry viewing port 62 is preferably centered on the sight central axis 48, as illustrated. The entry viewing port 62 is preferably asymmetric as discussed, but it may in some circumstances be made circular.

Figure 4:
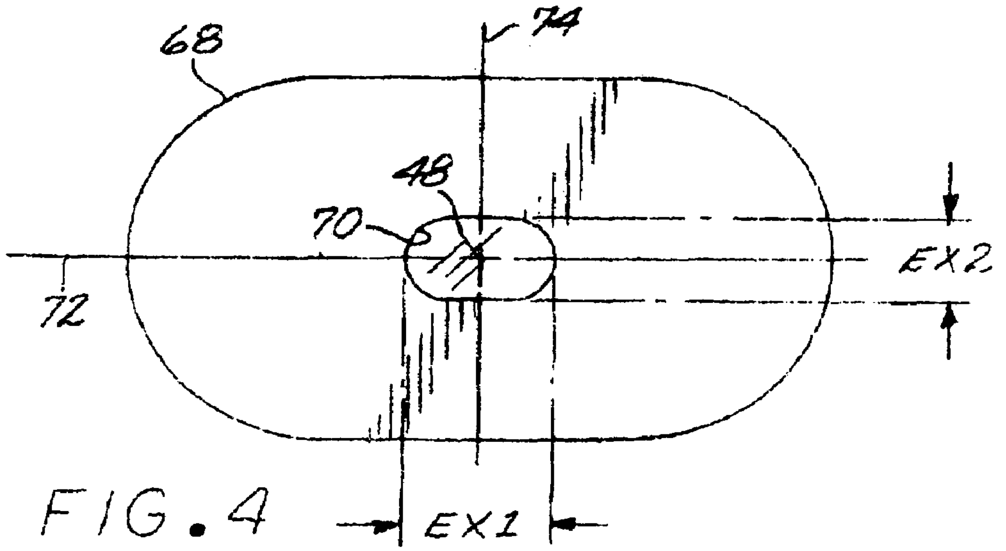
FIG. 4 is an elevational view of the exit end of the sight of FIG. 2.

The sight housing 38 has an exit end 68 with an exit viewing port 70, seen in FIGS. 2 and 4. The exit viewing port 70 has an exit viewing port first transverse direction 72 parallel to the lens first transverse direction 50 and an exit viewing port second transverse direction 74 parallel to the lens second transverse direction 52. Preferably, an exit port first transverse dimension EX1 measured along the exit viewing port first transverse direction 72 is greater than an exit port second transverse dimension EX2 measured along the exit viewing port second transverse direction 74. The exit viewing port 70 is preferably centered on the sight central axis 48, as illustrated. The exit viewing port 70 is preferably asymmetric as discussed, but it may in some circumstances be made circular.

For applications of most interest, the sight housing 38 is mounted to the rifle 20 in an orientation so that the sight first transverse direction 54 is parallel to the horizon when the user of the gun stands upright and peers through the sight 26. The sight second transverse direction 56 is therefore vertically oriented. The greater dimension of the sight housing S1 and the greater dimension of the lenses L1 are therefore also parallel to the horizon, giving the greater horizontal field of view parallel to the horizon and the smaller vertical field of view perpendicular to the horizon. This orientation provides the greatest utility for most applications, as the user typically sweeps the horizontal field of view parallel to the horizon in searching for targets. A portion of the sky and a portion of the foreground are lost in the reduced vertical field of view due to the truncation of the lenses 28. The reduced vertical field of view is generally acceptable in light of the increased horizontal field of view that is achieved without a weight or size penalty.

Figure 6:
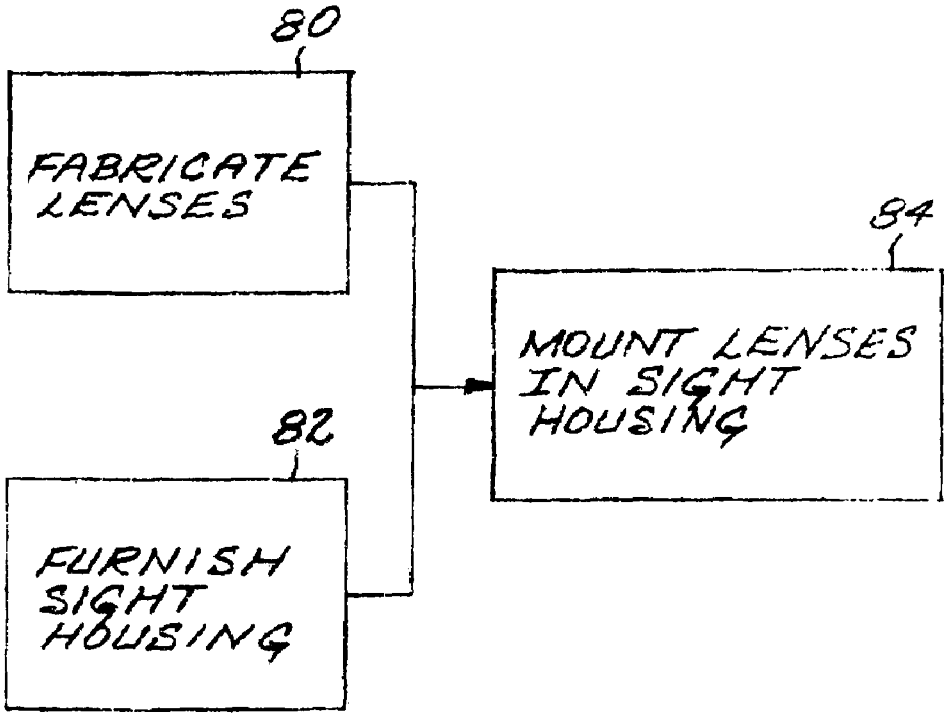
FIG. 6 is a block diagram of an embodiment of a method for manufacturing the sight.

FIG. 6 depicts the steps in a preferred approach for manufacturing the sight 26. The method includes fabricating at least one lens 28, step 80. The step of fabricating 80 preferably includes the step of preparing each lens 28 as optically circularly symmetric about the lens central axis 44 and having the lens first transverse direction 50 and the lens second transverse direction 52 orthogonal to each other and orthogonal to the lens central axis 44. Each lens 28 is physically truncated along the lens second transverse direction 52 at equal distances on either side of the lens central axis 44. The sight housing 38 is furnished with the construction described previously, step 82. Each lens 28 is mounted in the sight housing 38 in the manner described previously, step 84. Other compatible features described above may be used in conjunction with this method.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A telescopic sight, comprising:

at least one lens for providing magnification, wherein the at least one lens has a lens through-thickness direction and two orthogonal transverse directions perpendicular to the lens through-thickness direction, wherein a lens first transverse dimension measured along a lens first transverse direction is greater than a lens second transverse dimension measured along a lens second transverse direction, and wherein the at least one lens is optically circularly symmetric about a lens central axis parallel to the lens through-thickness direction, but physically truncated along the lens second transverse direction; and a sight housing in which the at least one lens is received, wherein the sight housing has a sight length direction parallel to the lens through-thickness direction, a sight first transverse direction parallel to the lens first transverse direction, and a sight second transverse direction parallel to the lens second transverse direction, and wherein a sight first transverse dimension measured along the sight first transverse direction is greater than a sight second transverse dimension measured along the sight second transverse direction.

2. The telescopic sight of claim 1, wherein the at least one lens comprises an objective lens, and an eyepiece lens.

3. The telescopic sight of claim 1, wherein the at least one lens comprises an objective lens, and an eyepiece lens, and wherein each lens has the lens through-thickness direction and the two orthogonal transverse directions perpendicular to the lens through-thickness directions, wherein the lens first transverse direction of all of the lenses are parallel, and wherein the lens first transverse dimension of each of the lenses is greater than the lens second transverse dimension of the respective lens.

4. The telescopic sight of claim 1, further including an entry viewing port of the sight housing, wherein the entry viewing port has an entry viewing port first transverse direction parallel to the lens first transverse direction and an entry viewing port second transverse direction parallel to the lens second transverse direction, and an exit viewing port of the sight housing, wherein the exit viewing port has an exit viewing port first transverse direction parallel to the lens first transverse direction and an exit viewing port second transverse direction parallel to the lens second transverse direction.

5. The telescopic sight of claim 1, further including an entry viewing port of the sight housing, wherein the entry viewing port has an entry viewing port first transverse direction parallel to the lens first transverse direction and an entry viewing port second transverse direction parallel to the lens second transverse direction, and wherein an entry port first transverse dimension measured along the entry viewing port first transverse direction is greater than an entry port second transverse dimension measured along the entry viewing port second transverse direction, and an exit viewing port of the sight housing, wherein the exit viewing port has an exit viewing port first transverse direction parallel to the lens first transverse direction and an exit viewing port second transverse direction parallel to the lens second transverse direction, and wherein an exit port first transverse dimension measured along the exit viewing port first transverse direction is greater than an exit port second transverse dimension measured along the exit viewing port second transverse direction.

6. The telescopic sight of claim 1, further including a gun-barrel attachment on an exterior of the sight housing.

7. The telescopic sight of claim 1, further including an adjustment to adjust a sight central axis of the sight relative to a bore axis of a gun barrel to which the sight is attached.

8. The telescopic sight of claim 1 including a second lens received by the sight housing, the second lens having a lens through-thickness direction and two orthogonal transverse directions perpendicular to the lens through-thickness direction, wherein a lens first transverse dimension measured along a lens first transverse direction is generally the same as a lens second transverse dimension measured along a lens second transverse direction, and wherein the second lens is optically circularly symmetric about a lens central axis parallel to the lens through-thickness direction.

9. A method for manufacturing a telescopic sight, comprising the steps of fabricating at least one lens having magnification, wherein the step of fabricating includes the step of preparing the at least one lens as optically circularly symmetric about a lens central axis and having a lens first transverse direction and a lens second transverse direction orthogonal to each other and orthogonal to the lens central axis, wherein the at least one lens is physically truncated along the lens second transverse direction at equal distances on either side of the lens central axis;

furnishing a sight housing, wherein the sight housing has a sight length direction, a sight first transverse direction, and a sight second transverse direction, and wherein a sight first transverse dimension measured along the sight first transverse direction is greater than a sight second transverse dimension measured along the sight second transverse direction; and mounting the at least one lens in the sight housing with the lens central axis parallel to the sight length direction and with the lens first transverse direction parallel to the sight first transverse direction.

10. The method of claim 9, wherein the step of preparing includes the step of physically truncating other lens parallel to the lens central axis.

11. The method of claim 9, wherein the at least one lens comprises an objective lens, and an eyepiece lens.

12. The method of claim 9, wherein the at least one lens comprises an objective lens and an eyepiece lens, and wherein the step of preparing includes the step of physically truncating each lens along its lens second transverse direction at equal distances on either side of its lens central axis.

13. The method of claim 9, wherein the step of furnishing the sight housing includes the step of furnishing the sight housing having an entry viewing port of the sight housing, wherein the entry viewing port has an entry viewing port first transverse direction parallel to the lens first transverse direction and an entry viewing port second transverse direction parallel to the lens second transverse direction, and an exit viewing port of the sight housing, wherein the exit viewing port has an exit viewing port first transverse direction parallel to the lens first transverse direction and an exit viewing port second transverse direction parallel to the lens second transverse direction.

14. The method of claim 9, wherein the step of furnishing the sight housing includes the step of furnishing the sight housing having an entry viewing port of the sight housing, wherein the entry viewing port has an entry viewing port first transverse direction parallel to the lens first transverse direction and an entry viewing port second transverse direction parallel to the lens second transverse direction, and wherein an entry viewing port first transverse dimension measured along the entry viewing port first transverse direction is greater than an entry port second transverse dimension measured along the entry viewing port second transverse direction, and an exit viewing port of the sight housing, wherein the exit viewing port has an exit viewing port first transverse direction parallel to the lens first transverse direction and an exit viewing port second transverse direction parallel to the lens second transverse direction, and wherein an exit port first transverse dimension measured along the exit viewing port first transverse direction is greater than an exit port second transverse dimension measured along the exit viewing port second transverse direction.

15. The method of claim 9, wherein the step of furnishing the sight housing includes the step of furnishing the sight housing having a gun-barrel attachment on an exterior of the sight housing.

16. The method of claim 9, including the step of fabricating a second lens that is optically circularly symmetric about a lens central axis and having a lens first transverse direction and a lens second transverse direction orthogonal to each other and orthogonal to the central axis of the second lens, wherein first and second dimensions along the first and second transverse directions of the second lens are generally equal; and mounting the second lens in the sight housing.

17. A telescopic sight comprising a sight housing having a central axis;

a first lens mounted in the sight housing, the first lens being optically circularly symmetric about the central axis and having a horizontal dimension greater than a vertical dimension;

a second lens mounted in the sight housing, the second lens being optically circularly symmetric about the central axis and having a horizontal dimension greater than a vertical dimension; and a third lens mounted in the sight housing, the third lens being located between the first and second lenses, being optically circularly symmetric about the central axis, and having a horizontal dimension about equal to a vertical dimension.

* * * * *